Jan. 22, 1957   G. C. PECK   2,778,146
FISHING BOBBER
Filed Jan. 25, 1956

INVENTOR.
GUY C. PECK

BY Robert H. Hatton
ATTORNEY

United States Patent Office 2,778,146
Patented Jan. 22, 1957

2,778,146

FISHING BOBBER

Guy C. Peck, Akron, Ohio

Application January 25, 1956, Serial No. 561,284

6 Claims. (Cl. 43—43.11)

This invention relates to fishing tackle and more particularly to an improved bobber assembly for use in fishing.

This invention is an improvement on the bobber assembly as described and claimed in application Serial No. 352,776, filed May 4, 1953, now Patent No. 2,734,303, of which I am one of the co-inventors. This particular invention provides an opening in bobber through which the line passes and another opening into which the leader and a wire element are inserted preparatory to casting or throwing out the line so that the possibilities of entanglement of the line and leader are reduced to a minimum. This assures that the line is free in the water and the fisherman is not wasting his time with the bait and hook just below the surface of the water. It is therefore an object of this invention to provide a simple, foolproof bobber assembly.

Another object of this invention is to provide a bobber that is inexpensive to manufacture and solves a problem that always has heretofore been present.

These and other objects will become apparent herein as the description hereof proceeds and in the claims hereunto appended.

Figure 1:
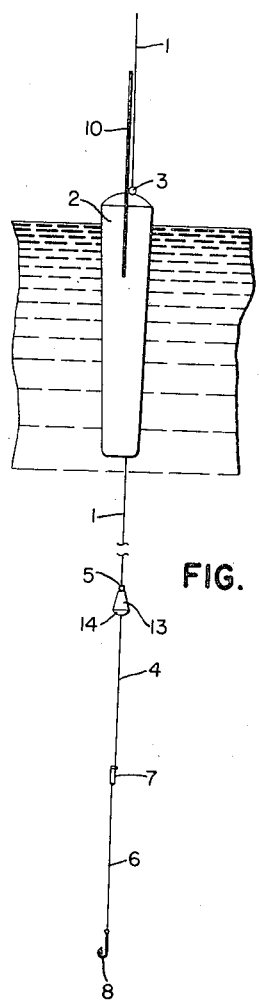
Fig. 1 is an elevation of the invention in the operative position.
Figure 4:
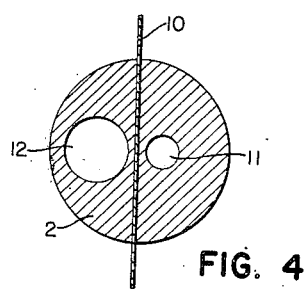
Fig. 4 is an enlarged section taken on line 4—4 of Fig. 3.
Figure 5:
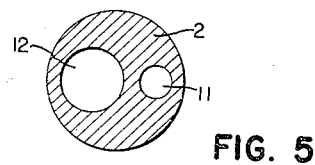
Fig. 5 is an enlarged section taken on line 5—5 of Fig. 3.
Figure 6:
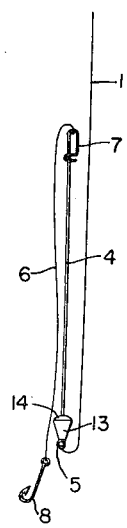
Fig. 6 is a detail view of a portion of the bobber assembly.

In Fig. 1 the line 1 extending from a rod (not shown) passes through the bobber body 2 with the pilot bobber 3 controlling the amount of line that extends below the bobber 2. A resilient element 4 of a length substantially equal to that of the bobber 2 is attached to the line 1 through an eye 5. On the opposite end of the element 4 is leader 6, well known in the art, attached to the eye 7 on the element 4. A hook 8 of the desired shape and size is attached to the other end of the leader 6 of a length substantially equal to that of the element 4.

The bobber body 2 as best seen in Figs. 2, 3, 4 and 5 preferably is of a round cross-section and tapered towards one end and formed of a light weight material such as wood or preferably from a molded plastic material. As shown, a fin 10 extending above and out from the sides of the body to assist in maintaining the bobber on a true, accurate course during casting, and is positioned on the body so as to form a balanced structure. Two bores 11 and 12 extend longitudinally through the body 2 in a side by side relation. The bore 11, nearest the center of the body 2 is of a size so that the line 1 will easily slide there through. The bore 12, as shown, is larger than bore 11 so that it will slidably receive the element 4 and leader 6 in a side by side relation as will be explained later. It has been found that by forming the bores 11 and 12 parallel to each other and parallel to the side of bobber adjacent the bore 12, that a well balanced bobber is obtained when the entire assembly is used. The surface of bores 11 and 12 should be smooth and may include a liner therein if desired.

The resilient element 4 is formed preferably of a thin, strong, rustproof wire such as music wire with eyes 5 and 7 on the ends. Adjacent eye 5, a weight 13 is formed around the element 4 with end surface 14 of a size to engage the periphery 15 of the body 2 adjacent the lower end of the bore 12 so as to limit the movement of the element 4 into the bore 12 as will become apparent hereinafter.

Figure 2:
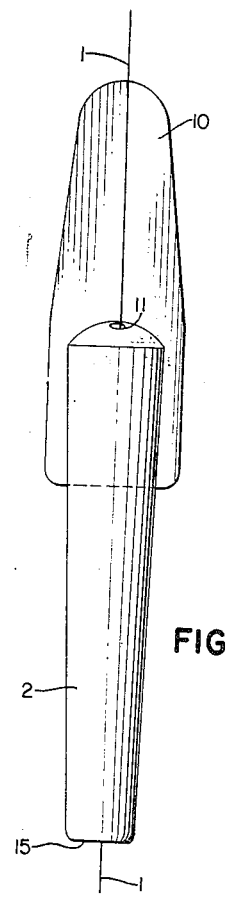
Fig. 2 is an elevation of the bobber.
Figure 3:
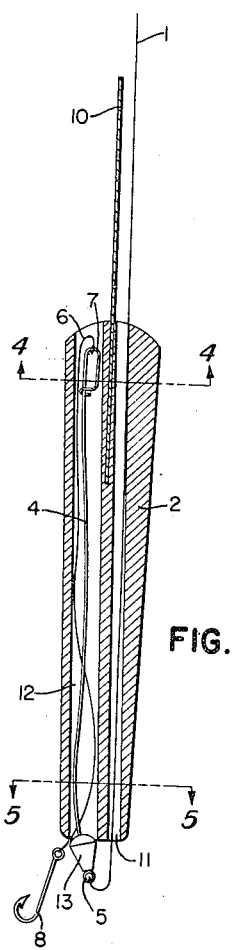
Fig. 3 is a sectional view of the bobber illustrating the method of using the bobber.

When using the bobber assembly, the element 4 is turned up 180° so that its position is exactly opposite to that in the extended position. This causes the leader 6 to be in a side by side relation to the element 4. In this position, the leader 6 and element 4 are telescoped into the bore 12 as seen in Fig. 3. The end 14 of the weight 13 engages the body 2 around periphery of the end of the bore 12 so that the travel is limited. The wire element 4 and leader may be longer than the body 2 if desired, and if so, will extend out the top of bore 12. The fin 10 completely separates the line from the portion sticking out beyond the bobber so that no entanglement can occur. The line 1 is reeled up through the bore 11 so that hook 8 and bait along with the weight 13 only extend beyond the "lead" end of the bobber when a cast or throw out is made. The leader 6 may be longer than the element 4 and if such a length is used, the extra portion will extend beyond the bobber end but will not materially interfere with the operation of the bobber since it will be below the bobber when it strikes the water. When the assembly strikes the water, the weight pulls the line 1 through the bore 11 and simultaneously withdraws the element 4 and leader 6 from the bore 12. When they are free of the bore, it is apparent that the leader and element then assume the position shown in Fig. 1. The line 1 continues to be pulled through the bore 11 until the selected depth of fishing is attained as determined by the pilot bobber 3. It is apparent that such an assembly may be used on windy days and rough water without the line and leader assembly becoming entangled whereas the heretofore used bobber assemblies do not permit this.

While certain representative embodiments and details have been shown for the purpose of illustrating the invention, it will be apparent to those skilled in the art that various changes and modifications may be made therein without departing from the spirit or scope of the invention.

I claim:

1. A fishing bobber assembly comprising an elongated buoyant body of substantially circular cross section and tapered toward one end and having two openings in a side-by-side relation extending in a lengthwise direction through said body, one of said openings adapted to slidably receive a line therein, and a resilient wire element of a length substantially equal to that of said body having means on one end for attachment of said line and means on the opposite end for attachment of a leader, a weight having at least a portion thereof of a size larger than the periphery of the other of said openings attached to said wire element adjacent said line attachment end adapted to abut the peripheral edge of the opening to limit the movement of the wire element into said opening, said opening being of a size to slidably receive the wire element and a leader in a side by side relation when preparing to cast or throw out the line, the weight withdrawing the wire element and leader from the opening when the bobber hits the water.

2. A fishing bobber assembly comprising an elongated buoyant body of substantially circular cross section and tapered toward one end and having two openings in a sideby-side position extending in a lengthwise direction through said body, a resilient wire element of a length substantially equal to that of said body having means on one end for attachment of a line and means on the opposite end for attachment of a leader, a weight larger than one of said openings attached to said wire element adjacent said line attachment end and adapted to abut the peripheral edge of the opening to limit the movement of the wire element into said opening, a leader attached to said wire element, and a line attached to the other end of said wire element and passing through the second of said openings in the body, said first opening being of a size to slidably receive the wire element and leader in a side by side relation when preparing to cast or throw out the line with the line passing through the second mentioned opening, the weight withdrawing the wire element and leader from the opening and simultaneously drawing the line through the bobber when the bobber hits the water.

3. A fishing bobber assembly comprising an elongated buoyant integrally formed plastic body of substantially circular cross-section having a pair of longitudinal openings extending in a side by side relation through said body, a resilient wire element of a length substantially equal to that of said body having means on one end for attachment of a line and means on the opposite end for attachment of a leader, a weight having at least a portion thereof of a size larger than the periphery of one of said openings attached to said wire element adjacent said line attachment end adapted to abut the peripheral edge of the opening to limit the movement of the wire element into said opening, said opening being of a size to slidably receive the wire element and a leader in a side by side relation when preparing to cast or throw out the line, the weight withdrawing the wire element and leader from the opening when the bobber hits the water.

4. A fishing bobber assembly comprising an elongated buoyant tapered body having a pair of spaced longitudinal openings in a side by side relation extending therethrough, one of said openings being of a diameter to slidably receive a leader and a resilient wire element in a side by side relation therein and the other opening adapted to slidably receive a line, said resilient wire element being of a length substantially equal to that of said body having line attachment means on one end and leader attachment means on the opposite end thereof, and a weight attached to said wire element having at least a portion thereof of a size larger than the periphery of said first mentioned opening adjacent said line attachment end adapted to abut the lower peripheral edge of said opening to limit the movement of the leader and wire element into said opening, the wire element and leader attached thereto in the casting position being in a side by side relation in said second opening with the leader attachment end of said wire element being toward the top of the bobber body.

5. A fishing bobber assembly comprising an elongated buoyant tapered body and a resilient wire element, said body having a pair of spaced longitudinal openings in a side by side relation extending therethrough, one of said openings being of a diameter to slidably receive a leader and a resilient wire element in a side by side relation therein and the other opening adapted to slidably receive a line, the first mentioned opening being adjacent to and substantially parallel to the side of said body and the second mentioned opening being substantially parallel to said first opening, the axes of said openings lying in a diameter of said body, and said resilient wire element being of a length substantially equal that of said body having line attachment means on one end and leader attachment means on the opposite end thereof, and a weight attached to said wire element having at least a portion thereof of a size larger than the periphery of said first mentioned opening adjacent said line attachment end adapted to abut the lower peripheral edge of said opening to limit the movement of the leader and wire element into said opening, the wire element and leader attached thereto in the casting position being in a side by side relation in said second opening with the leader attachment end of said wire element being toward the top of the bobber body.

6. A fishing bobber assembly comprising an elongated buoyant tapered body and a resilient wire element, said body having a pair of spaced longitudinal openings in a side by side relation extending therethrough, and a fin extending laterally out from the top and sides thereof and between the openings in the top of the body, one of said openings being of a diameter to slidably receive a leader and a resilient wire element in a side by side relation therein and the other opening adapted to slidably receive a line, the first mentioned opening being adjacent to and substantially parallel to the side of said body and the second mentioned opening being substantially parallel to said first opening, the axes of said openings lying in a diameter of said body, and said resilient wire element being of a length substantially equal to that of said body having line attachment means on one end and leader attachment means on the opposite end thereof, and a weight attached to said wire element having at least a portion thereof of a size larger than the periphery of said first mentioned opening adjacent said line attachment end adapted to abut the lower peripheral edge of said opening to limit the movement of the leader and wire element into said opening, the wire element and leader attached thereto in the casting position being in a side by side relation in said second opening with the leader attachment end of said wire element being toward the top of the bobber body.

References Cited in the file of this patent
UNITED STATES PATENTS

| | | |
|---|---|---|
| 2,475,736 | Burrous | July 12, 1949 |
| 2,607,154 | Martens | Aug. 19, 1952 |
| 2,734,303 | Peck et al. | Feb. 14, 1956 |